US012661792B2

(12) United States Patent
Gaschler

(10) Patent No.: US 12,661,792 B2
(45) Date of Patent: Jun. 23, 2026

(54) REAL-TIME TEXT LOGGING BY THREAD-LOCAL BUFFERING

(71) Applicant: Intrinsic Innovation LLC, Mountain View, CA (US)

(72) Inventor: Andre Gaschler, Munich (DE)

(73) Assignee: Intrinsic Innovation LLC, Mountain View, CA (US)

( * ) Notice: Subject to any disclaimer, the term of this patent is extended or adjusted under 35 U.S.C. 154(b) by 232 days.

(21) Appl. No.: 18/753,957

(22) Filed: Jun. 25, 2024

(65) Prior Publication Data

US 2025/0387914 A1     Dec. 25, 2025

(51) Int. Cl.
B25J 9/16     (2006.01)
G06F 3/06     (2006.01)

(52) U.S. Cl.
CPC .......... B25J 9/1674 (2013.01); G06F 3/0605 (2013.01); G06F 3/0656 (2013.01); G06F 3/0671 (2013.01)

(58) Field of Classification Search
CPC ..... B25J 9/1674; B25J 9/1628; G06F 3/0656;

G06F 5/06; G06F 9/30123; G06F 11/3476; G06F 11/3419; G06F 2201/805; G06F 2201/865; G06F 3/0605; G06F 3/0671

See application file for complete search history.

(56) References Cited

U.S. PATENT DOCUMENTS

| | | | |
|---|---|---|---|
| 8,732,675 B2 * | 5/2014 | Liang .................. | G06F 11/3409 717/124 |
| 11,061,801 B1 * | 7/2021 | Beardsworth .......... | B25J 9/1628 |

* cited by examiner

*Primary Examiner* — Idriss N Alrobaye
*Assistant Examiner* — Richard B Franklin
(74) *Attorney, Agent, or Firm* — Fish & Richardson P.C.

(57) ABSTRACT

Methods, systems, and apparatus, including computer programs encoded on computer storage media, for performing real-time text logging. One of the methods comprises receiving, by a real-time robotics control framework, multiple indications of multiple events associated with multiple log messages. For each log message of the multiple log messages, the method further includes writing, by a real-time thread, characters of the log message into a buffer dedicated to the real-time thread using real-time safe commands, receiving, by a non-real-time thread of the real-time robotics control framework, an indication that the log message has been written into the buffer, and reading the log message and writing to a non-real-time output channel.

20 Claims, 3 Drawing Sheets

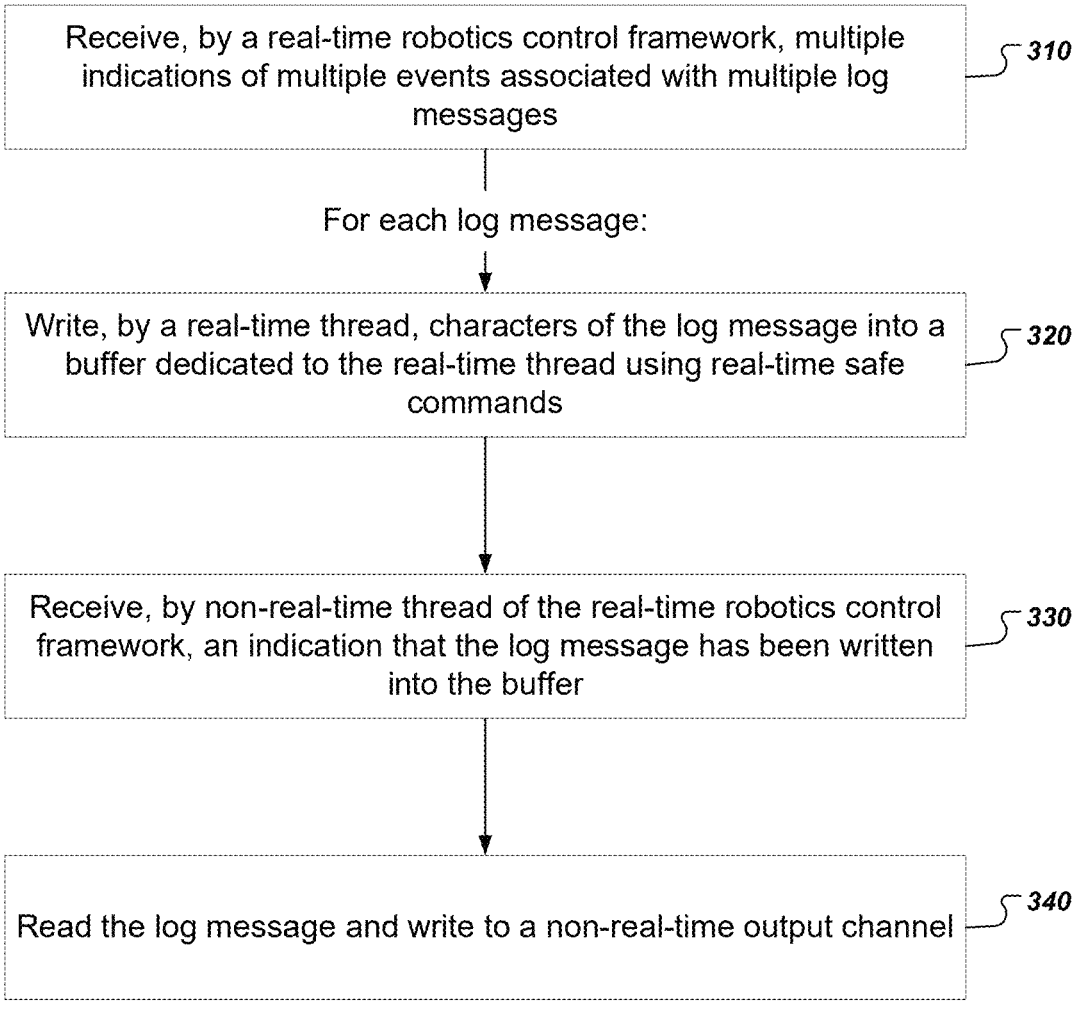

Receive, by a real-time robotics control framework, multiple indications of multiple events associated with multiple log messages ⌐ 310

For each log message:

Write, by a real-time thread, characters of the log message into a buffer dedicated to the real-time thread using real-time safe commands ⌐ 320

Receive, by non-real-time thread of the real-time robotics control framework, an indication that the log message has been written into the buffer ⌐ 330

Read the log message and write to a non-real-time output channel ⌐ 340

FIG. 3

REAL-TIME TEXT LOGGING BY THREAD-LOCAL BUFFERING

BACKGROUND

This specification relates to frameworks for software control systems.

Real-time software control systems are software systems that must execute within strict timing requirements to achieve normal operation. The timing requirements often specify that certain actions must be executed or outputs must be generated within a particular time window in order for the system to avoid entering a fault state, where a system can halt execution or take some other action that interrupts normal operation. Such real-time software control systems are often used to control physical machines that have high precision and timing requirements. In this case, the system can determine whether the requirements are met based on receiving real-time observations regarding the executed action or generated outputs. In particular, the system can receive the real-time observations as log messages.

As one example, a workcell of industrial robots can be controlled by a real-time software control system that requires each robot to repeatedly receive commands at a certain frequency, e.g., 1, 10, or 100 kHz. In this specification, a workcell is the physical environment in which a robot will operate. Workcells have particular physical properties, e.g., physical dimensions that impose constraints on how robots can move within the workcell.

Some systems can perform logging of messages from a workcell by logging the messages with message information and a corresponding timestamp. However, conventional systems may not be able to perform text logging in a real-time safe manner because the real-time software control must meet the strict timing requirements in order to efficiently log the one or more messages to prevent blocking other operations or increasing latency in the system.

SUMMARY

This specification describes a real-time robotics control system that performs real-time logging using thread-local buffering based on receiving one or more messages associated with an event in an operating environment. A real-time control system is a software system that is required to perform actions within strict timing requirements in order to achieve normal operation.

The real-time control system can perform real-time text logging using threads to enable communication between a real-time control layer and a non-real time server. In this specification, a thread is a separate path of execution for a task within a program run by the real-time robotics control system. The real-time control system can implement multiple threads in a program to allow for parallel execution of tasks, and the real-time control system can communicate between the real-time control layer and the non-real time server to control and receive observations about an operating environment.

In this specification, the operating environment includes multiple subsystems, each of which can include one or more real-time robots, one or more computing devices having software or hardware modules that support the operation of the robots, or both. The framework provides mechanisms for bridging, communication, or coordination between the multiple systems, including forwarding control parameters from a robot application system, providing sensor measurements from sensors to a real-time robotic control system, and receiving hardware control inputs from the real-time robotic control system, all while maintaining the tight timing constraints of the real-time robot control system, e.g., at the order of one millisecond.

As one example, the techniques described in this specification allow a system to log one or more received messages by writing to buffers each dedicated to a real-time thread using real-time safe commands. The one or more messages may arrive at varying rates or non-deterministically or both, such as sensor measurements from one or more sensors of the system. As another example, the techniques described in this specification allow the system to write the one or more messages to a non-real-time output channel based on receiving an indication for each message that the system has written the message to the buffer. As yet another example, the techniques described in this specification allow for custom real-time handling of text logging based on filtering one or more messages, truncating one or more messages, or both.

Particular embodiments of the subject matter described in this specification can be implemented so as to realize one or more of the following advantages.

Conventional systems perform text logging (e.g., Abseil logging) by logging one or more messages with a corresponding timestamp. However, conventional systems may not perform text logging in a real-time safe manner, where the system must receive and perform any operation associated with receiving the messages within a real time tick, and the system must enable synchronization mechanisms to control access to shared memory resources. As a result, the logging operation can block and delay critical functions by the real-time thread of the system. For example, a robot may be required to read commands every millisecond and write log messages within 0.1 milliseconds, otherwise the robot hardware may be required to perform an emergency stop, and the logging operation may cause unnecessary latency in performing robot functions.

In some cases, systems can perform real-time text logging, but the system may not structure the text logging to be deterministic (e.g., structured in a particular manner) in form or length, causing undefined latency when exporting the messages that can block other function critical messages about the operation environment. In some cases, system can perform real-text logging using thread pooling, where the system maintains and allocates multiple threads (e.g., non-real-time threads) for parallel execution of tasks. However, maintaining multiple threads that may not receive a log message can be inefficient and can result in latency in the system, further resulting in missed control cycle timing and failing to control real-time critical hardware.

In contrast, the techniques described in this specification allow the real-time software control system to perform real-time logging using thread-local buffering in order to efficiently log and export one or more messages about the operation environment. The system can implement thread-local buffering by allocating a dedicated buffer for each real-time thread of the real-time control layer using real-time safe commands, such that the real-time thread does not have to wait to write the message to the buffer or check if other threads are writing to the buffer. The real-time safe commands are non-blocking and deterministic such that the real-time logging can follow the strict timing requirements of the system. Based on implementing the dedicated buffer, the system can write characters of a log message into the buffer, the system can wake-up the non-real time thread and send an indication to the non-real-time thread (e.g., log sync thread) that the log message has been written into the buffer.

Additionally, the system can control the structure of the log messages by preallocating each buffer prior to executing the real-time safe commands based on the characters of the log message. For example, the system can truncate characters of the log message based on the preallocation. Additionally, the system can efficiently export the log message by filtering the messages (e.g., excessive messages) based on a counter, which increases efficiency of the system because the system does not have to provide every message logged by the threads to an output channel, such as a file or a cloud-based system.

Therefore, the control system can efficiently perform real-time text logging of one or more messages, which can enable a user of the system to debug or monitor the system based on the logged messages, resulting in more reliability when completing a particular task.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

FIG. 3 is a flowchart of an example process for performing real-time text logging.

Like reference numbers and designations in the various drawings indicate like elements.

DETAILED DESCRIPTION

Figure 1:
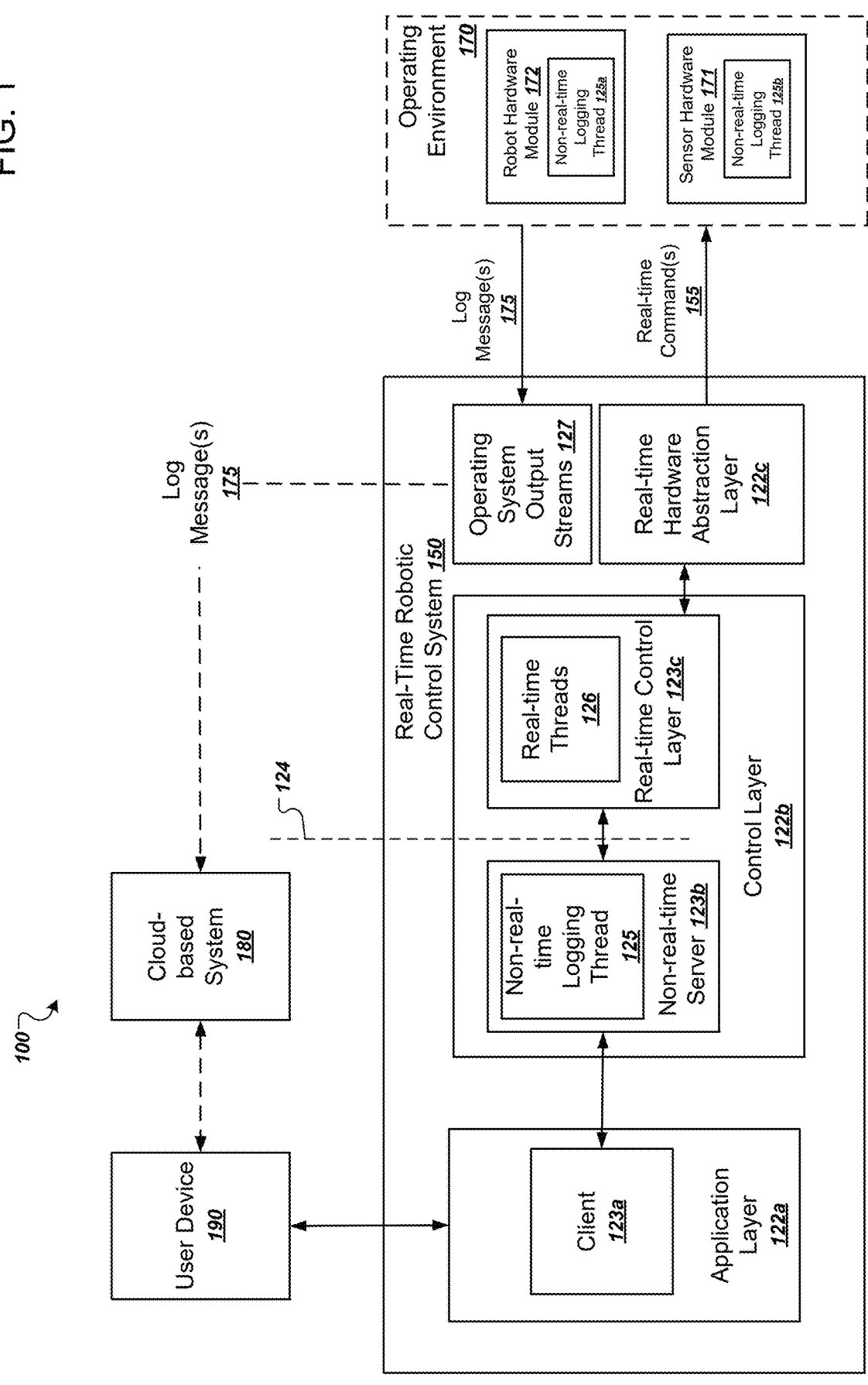
FIG. 1 is a diagram of an example system.

FIG. 1 is a diagram of an example system 100. The system 100 includes a real-time robotic control system 150 to drive multiple robots of a robot hardware module 172, multiple sensors of a sensor hardware module 171, or both in an operating environment 170. The system 100 includes a number of functional components that can each be implemented as computer programs installed on one or more computers in one or more locations that are coupled to each other through any appropriate communications network, e.g., an intranet or the Internet, or combination of networks.

The system 100 is an example of a system that can implement the real-time robotics control framework as described in this specification. In particular, the system 100 can perform real-time text logging using thread-local buffering in a control layer. In this specification, a robotic control system being described as being real-time means that is required to execute within strict timing requirements to achieve normal operation. The timing requirements often specify that certain actions must be executed or outputs must be generated within a particular time window in order for the system to avoid entering a fault state. For brevity, each time window may be referred to as a tick or a control tick. In the fault state, after a tick has elapsed without completing its required computations or actions, the system can halt execution or take some other action that interrupts normal operation, e.g., returning the robots to a starting pose or a fault pose.

In this specification, the real-time control system performs real-time text logging by logging one or more messages based on receiving and performing operations associated with receiving the messages within a real time tick using synchronous or asynchronous programming. Synchronous programming is straightforward. When a call to a function is made, a thread is blocked and waits until the function is completed before been unblocked. By contrast, in asynchronous programming, a calling thread that initiates an asynchronous call to a function is not blocked and can perform other processing, thereby allowing an ongoing work to continue or other additional work to be performed while a computation is executed.

In this specification, thread-local buffering means allocating (e.g., assigning) a dedicated buffer to each real-time thread of a real-time control layer using real-time safe commands An advantage of performing real-time text logging using thread-local buffering based on real-time safe commands is that the system does not have to log the messages using synchronous programming because the real-time safe commands are non-blocking and deterministic, and the system can write the messages to a dedicated buffer without waiting or checking for other threads.

A user of the system 100 can initiate the execution of one or more operations of one or more robots by providing real-time control code to the real-time robotic control system 150. For example, a user can use a user device 190 to provide real-time control code to the application layer 122a.

The real-time robotic control system 150 can then prepare the real-time control code for execution. Different portions of the real-time control code can be executed in different layers of the control stack, e.g., in the client 123a, the non-real-time server 123b, the real-time control layer 123c, or some combination of these.

Generally, the control stack of the real-time robotic control system 150 follows a client-server model in which a client 123a provides commands to the non-real-time server 123b and the client 123a can receive observations in the form of log messages 175. In particular, the non-real-time server 123b handles passing commands and receiving log messages over a boundary 124 between real-time and non-real-time code. The non-real-time server 123b may execute on a common computer with the client 123a, or operate on a different computer.

Based on providing commands or receiving log messages, the real-time robotic control system 150 is then configured to control the robots 172a-n in the operating environment 170 according to the real-time control code. To control the robots 170a-n in the operating environment 170, the real-time robotic control system 150 provides commands, e.g., commands 155a-n, to be executed by one or more robots, e.g., robots 172a-n, in the operating environment 170. The real-time robotic control system 150 can provide one or more real time commands 155 to one or more robots of the robot hardware module 172, and the real robotic control system 150 can provide one or real-time commands 155 to one or more sensors of the sensor hardware module 171.

In order to compute the commands 155, the real-time robotic control system 150 consumes log messages 175a-n made by one or more robots of the robot hardware module 172, one or more sensors of the sensor hardware module 171, or both gathering data within the operating environment 170. The log messages 175 can be observations for debugging actions performed by the robots 172, as described in further detail below with reference to FIG. 2. In particular, the robot hardware module 172 and the sensor hardware module 171 each include a non-real time logging thread 125 configured to perform the logging process by receiving log messages 175 from a buffer and writing the log messages 175 to the real-time robotic control system 150, as described in further detail below with reference to FIG. 2. In this case, the logging process for each sensor, each robot, or both can be a separate process.

The commands 155 and the log messages 175 can include information about warnings or errors about the actions of the robots 172. For example, a log message 175 can read: "Warning: Received ethercat frame delayed by >100 us" or 'Error: sensor IP address xyz did not respond' or 'Warning: joint position singular, jacobian cannot be inverted.". The continuous real-time control signals can be consumed by the hardware abstraction layer 122c. The hardware abstraction layer 122c can include software module, e.g., a real-time controller module, that interfaces the robot 172a-n, e.g., by issuing real-time commands 155a-n to drive the movements of the moveable components such as joints of the robots 172a-n in the operating environment 170 to follow the target trajectory.

The real-time robotic control system 150 can receive the log messages 175 from the operation environment 170 using real-time text logging. In particular, the real-time robotic control system 150 uses dedicated thread-local buffers to efficiently receive a log message within a real-time tick, and the real-time control system can use real-time safe commands to ensure that the log message and the functions performed to receive and write log message to the buffer are non-blocking and deterministic, as described in further detail below with reference to FIGS. 2 and 3.

As illustrated in FIG. 1, each sensor of the sensor hardware module 171 is coupled to a respective robot of the robot hardware module 172. However, the sensors need not have a one-to-one correspondence with robots and need not be coupled to the robots. In fact, each robot can have multiple sensors, and the sensors can be mounted on stationary or movable surfaces in the operating environment 170. Any suitable sensors can be used, such as distance sensors, force sensors, torque sensors, cameras, to name just a few examples.

Typically, the commands 155 and the log messages 175 are generated cyclically during each control cycle, e.g., one log message and one command per control cycle. Lower levels of the software stack generally have tighter time requirements than higher levels of the software stack. At the lowest levels of the software stack, for example, the control cycle can have actual real-time requirements.

The specifics of timing constraints and the flexibility related to timing windows are generally configurable aspects of the real-time robotic control system 150 that can be tailored for the task being performed. In an example system, the real-time requirements of the real-time robotic control system 150 require that the hardware abstraction layer 122c provide a command at a first rate (or frequency), e.g., every 5, 10, or 20 milliseconds, while the non-real-time requirements of the real-time robotic control system 150 specify that the control layer 122b should provide a command to the hardware abstraction layer 122c at a second rate that is often lower than the first rate, e.g., every 25, 50, or 100 milliseconds. In addition, the rates need not be fixed. For example, the hardware abstraction layer 122c can provide a command at a fixed rate, while the application layer 122a can provide a command at a varying rate or a rate that is sporadic. In particular, to bridge the boundary between the log messages exported by a non-real-time logging thread 125 and the log messages received by multiple real-time threads 126, the real-time robotic control system 150 can use the control layer 122b which, in turn, can include both a real-time control layer 123c and a non-real-time server 123b that collectively facilitate receiving the log messages 175. The control layer 122b serves as a bridging module in the control stack that translates each log message.

Due to the timing constraints of the real-time control system, the real-time control system can implement the real-time text logging mechanisms to increase the efficiency of the system based the multiple real-time threads 126 of the real-time control layer 123c receiving one or more log messages and the non-real-time logging thread 125 of the non-real-time server 123b reading, writing, and exporting the one or more log messages.

In particular, the real-time control system can integrate dedicated thread-local buffers to perform the real-time text logging for receiving the one or log messages 175, as described in more detail below with reference to FIGS. 2 and 3. For example, the real-time robotic control system can configure the robots, the sensors, or both to report the log messages 175 as the one or more messages based on sensor data. For example, a user can define a condition based on a force sensor such that when the force as measured by the force sensor exceeds a particular threshold, the sensor of the sensor hardware module 171 can use the non-real-time logging thread 125b to send an error message to the operating system output streams 127, as described in further detail below with reference to FIGS. 2 and 3. The operating system output streams 127 are configured to read the log messages 175 and, in some examples, to provide the log messages 175 to the cloud-based system 180. The cloud-based system 180 is configured to store one or more error messages corresponding to one or more log messages, and a user can use the user device 190 to query the cloud-based system for an error message that corresponds to the received log message 175, as described in further detail with reference to FIG. 3.

Figure 2:
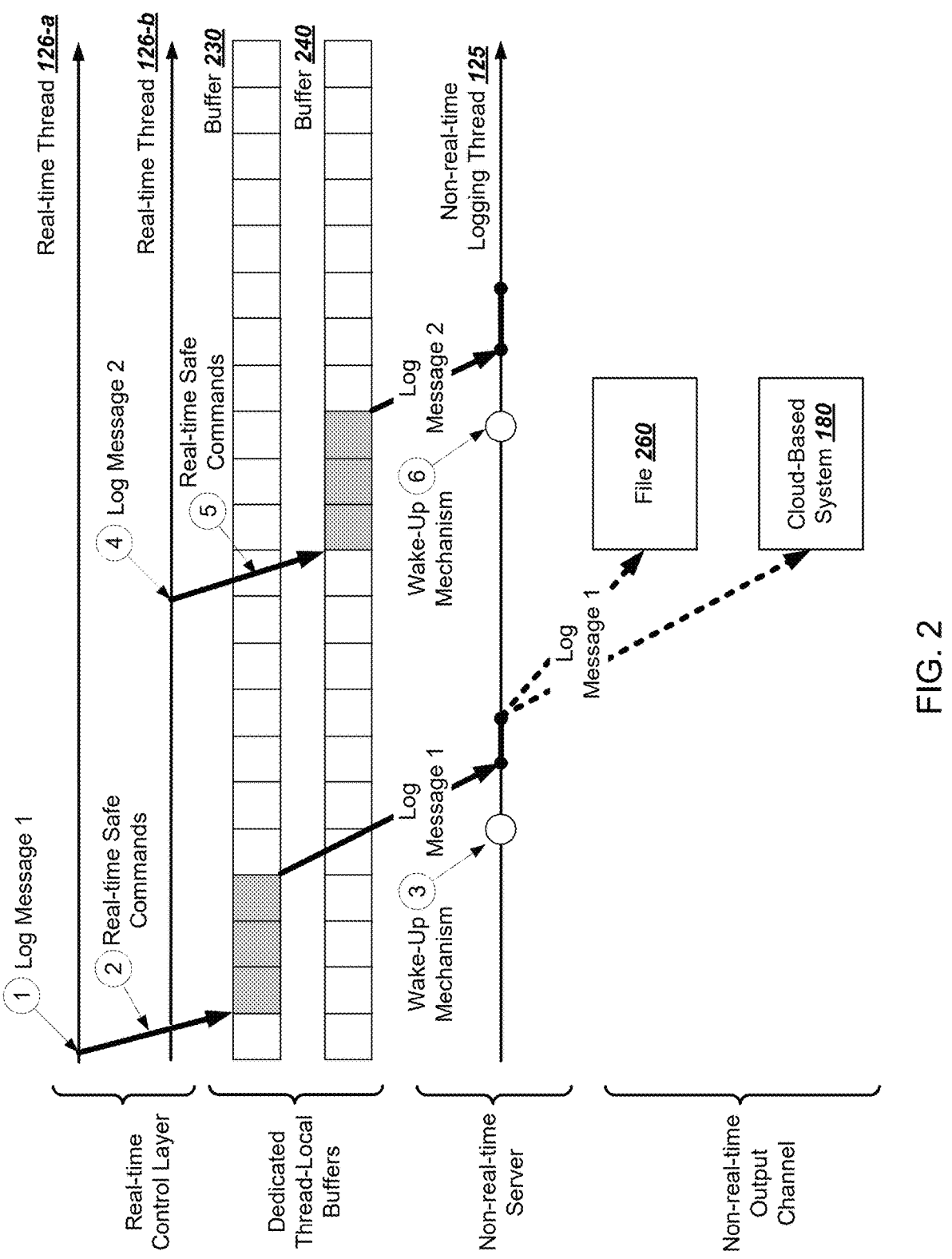
FIG. 2 is an example illustration of using thread-local buffering to perform real-time text logging.

FIG. 2 is an example illustration of using thread-local buffering to perform real-time text logging. In FIG. 2, the horizontal line segments indicate time spent in thread execution, while arrows between line segments indicate causal relationships between threads, e.g., in the form of notifications. For example, a robot of the robot hardware module 172 can perform the real-time text logging as part of a logging process.

Each real-time thread (e.g., real-time thread 126-a and real-time thread 126-b) is associated with its own dedicated buffer (e.g., buffer 230 and buffer 240). The real-time control layer can receive a log message, and the system can efficiently implement the real-time text logging mechanism using the dedicated to send the message to a non-real-time logging thread 125 of the non-real-time server and export the message to a non-real-time output channel. The non-real-time output channel can be included in the system, such as a file in the application layer, or external to the system, such as a cloud-based system. By using the dedicated thread-local buffers, the real-time control system can perform deterministic and non-blocking real-time text logging for one or more log messages.

The log message 175 can be an observation from a sensor of the operating environment. For example, the log message can be an error message based on an action being performed by a robot. In particular, the log message 172 can include a warning level (e.g., info, warning, error), a filename and line number corresponding to source code, and text that can be a combination of strings and printed data.

In some cases, the log message can include a timestamp. In some cases, the log message can report one or more functions being called by the system to perform actions in the operating environment. In this case, the log message can further report values of the arguments of the one or more functions, such as the inputs or the output of the functions.

The log messages can different data types, and the process can export the log messages as a real-time safe string. For example, a text log message can be a combination of constant string literals, integers, floating point numbers, a tuple, or a fixed-length string.

In response to receiving the log message 1 (1), the real-time thread 126-a can preallocate a dedicated buffer 230 for the real-time thread (allocation is typically done at static initialization time of the thread) 126-a to write characters of the log message into the buffer. In particular, the real-time thread 126-a can preallocate the buffer 230 based on truncating one or more characters of the log message based on the characters being greater than a maximum size. In this case, the real-time thread 126-a uses real-time safe functions to avoid dynamic memory allocation and to avoid exceeding the pre-allocated buffer. For example, if the log message 1 is a floating point number, the real-time thread 126-a can truncate one or more of the decimal digits of the floating point number based on the total digits of the floating point number being greater than a maximum number. The real-time thread 126-a can then preallocate the buffer 230 based on the number of truncated digits. The real-time thread 126-a uses the existing buffer to write the floating point number by truncating the text output to buffer size.

In general, a real-time thread of the real-time control system can write a received log message to a non-real-time logging thread 125 of the real-time control system using a buffer, and the non-real-time logging thread 125 can export the log message. The log message can be an alert or an error message used by the system to debug one or more actions in the operating environment.

Based on preallocating the buffer 230, the real-time thread 126-a uses real-time safe commands (2) to write the log message 1 to the dedicated buffer 230. The real-time safe commands are non-blocking and deterministic operating system functions. In particular, the real-time safe commands are limited to a particular number of operating system functions for writing the characters of the log message within a particular real-time tick.

The real-time control system can then use a non-blocking wake-up mechanism (3) to wake up the non-real-thread 250 for the non-real time thread to read the log message 1. In particular, the wake-up mechanism (3) an atomic flag, a user space mutex (e.g., a Linux fast user space mutex (futex)), or another non-blocking synchronization parameter. The atomic flag can be a Boolean expression. The futex can be a fast user space mutual exclusion algorithm of the operating system that allows the real-time thread 126-a to notify the non-real-time logging thread 125 in a non-blocking manner based on the futex not being used by another real-time thread. Using non-blocking wake-up mechanisms reduces latency in the system in comparison to conventional methods, such as polling, because the non-real time thread 250 does not have to continue checking whether the real-time control thread has written the log message to buffer.

Based on waking up the non-real-time logging thread 125, the non-real-time logging thread 125 can read the log message 1 from the buffer 230 by servicing the buffer 230 in a non-real-time priority. The non-real time thread 250 can then write the log message 1 to a non-real-time output channel using a stack-allocated class. For example, the non-real time thread 250 can write the log message 1 to a file 260. The file 260 can be a file of the application layer 122a of the system configured to store multiple log messages. For example, the non-real-time thread 250 can write the message to a process error stream output (e.g., an operating system output stream). In this case, a user of the real-time control system can inspect the output stream to view the log message 1 and to debug the system based on the log message 1.

In another example, the non-real-time logging thread 125 can write the log message 1 to a cloud-based system 180. For example, the cloud-based system 180 can be a storage device or a database configured to store multiple log messages. In some cases, a user can query the cloud-based system for the log message 1, particularly in the case where the log message 1 is a real-time error message.

In some cases, the non-real-time logging thread 125 can filter a received log message, such that the system does not export excessive messages to the non-real-time output channel. In general, the non-real-time logging thread 125 is configured to process multiple log messages (e.g., tens of thousands of messages) during a non-real time tick, and if the system logs every message, a user of the system may not be able to efficiently monitor and debug the system based on inspecting the log messages. Additionally, in some cases, the messages can be the same message, making the messages redundant. Thus, the non-real-time logging thread 125 can filter one or more received log messages based on the log messages being received within a particular timeframe or at a particular interval.

For example, the real-time thread 126-b can receive log message 2 (4) after receiving log message 1. The real-time thread 126-b can preallocate the dedicated buffer 240, and the real-time thread can write the characters of the log message 2 to the buffer 240 using the real-time safe commands (5). The real-time control system can then use the wake-up mechanism (6) to wake up the non-real-time-thread logging 125 for the non-real time thread to read the log message 2.

The non-real-time logging thread 125 can determine whether to filter the log message 2 and not export the log message 2 based on one or more criteria. For example, the non-real-time logging thread 125 can refrain from writing and exporting the log message 2 based on the log message 2 being an n-th log message or not being an n-th log message (e.g., a $1000^{th}$ log message). In another example, the non-real-time logging thread 125 can refrain from writing and exporting the log message 2 based on the log message 2 being received within a particular timeframe (e.g., the log message 2 was received within a 10 second time span). By refraining from exporting the log message 2, which may be the same log message as log message 1, a user can more efficiently monitor the system based on the exported log messages.

FIG. 3 is a flowchart of an example process for performing real-time text logging. The process can be implemented by one or more computer programs installed on one or more computers and programmed in accordance with this specification. For example, the process can be performed by the real-time robotic control system 150 shown in FIG. 1. For convenience, the process will be described as being performed by a system of one or more computers.

As described above, the system implements mechanisms for performing real-time text logging using dedicated thread-local buffers as part of the real-time robotics control framework.

The system receives, by the real-time robotics control framework, multiple indications of multiple events associated with multiple log messages (310).

For each log message, the system writes, by the real-time thread of the real-time robotics control platform, characters of the log message into a buffer dedicated to the real-time thread using real-time safe commands (320). The system uses the real-time safe commands to write the characters of the log message into the buffer by executing the real-time safe commands during every tick of a real-time control cycle. In particular, the real-time commands are operating system functions that are non-blocking and deterministic, and thus, real-time safe.

In some cases, prior to writing to the buffer and executing the real time safe commands, the system preallocates the buffer for the real-time thread based on the characters of the log message. For example, the system can truncate one or more characters of the log message based on the characters being a maximum size, and the system can preallocate the buffer based on the truncated characters. In one example, the system can receive a log message with an indicating of a floating point number corresponding to a particular event, and the system can truncate one or more decimal digits of the floating point number based on the digits of the floating number being a maximum size.

In some cases, the system can filter one or more of the log messages based on a counter. In particular, the system can filter the one or more log messages based on the counter indicating that a number of the log messages has exceeded a threshold number of log messages within a particular time frame. In another case, the system can filter the one or more messages based on the counter indicating that the one or more log message is the n-th log message. For example, the system can filter for every $1000^{th}$ log message based on the counter.

The system receives, by a non-real time thread of the real-time robotics control framework, an indication that the log message has been written into the buffer (330). In particular, the system can wake up the non-real time thread using an atomic flag, a user space mutex, or both. Based on the system waking up the non-real time thread, a non-real time control server can identify the indication that the log message has been written into the buffer in an efficient manner, such that the control server does not have to constantly check whether an indication has been received.

The system then reads the log message and writes the log message to a non-real-time output channel (340). In some cases, the system can write to a file of the non-real-time output channel. In some other cases, the system can write to a cloud-based system, and the system can query the cloud-based system for one or more types of log messages including real-time error messages. For example, the system can provide the log message to an operating system output stream of the real-time robotics control framework, and the operating system output stream can provide the log message to the cloud-based system.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application-specific integrated circuit). The apparatus can optionally include, in addition to hardware, code that creates an operating environment for computer programs, e.g., code that constitutes processor firmware, a protocol stack, a database management system, an operating system, or a combination of one or more of them.

A computer program which may also be referred to or described as a program, software, a software application, an app, a module, a software module, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

As used in this specification, an "engine," or "software engine," refers to a software implemented input/output system that provides an output that is different from the input. An engine can be an encoded block of functionality, such as a library, a platform, a software development kit ("SDK"), or an object. Each engine can be implemented on any appropriate type of computing device, e.g., servers, mobile phones, tablet computers, notebook computers, music players, e-book readers, laptop or desktop computers, PDAs, smart phones, or other stationary or portable devices, that includes one or more processors and computer readable media. Additionally, two or more of the engines may be implemented on the same computing device, or on different computing devices.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and pointing device, e.g., a mouse, trackball, or a presence sensitive display or other surface by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone, running a messaging application, and receiving responsive messages from the user in return.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface, a web browser, or an app through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

In addition to the embodiments described above, the following embodiments are also innovative:

Embodiment 1 is a computer-implemented method comprising:

receiving, by a real-time robotics control framework, a plurality of indications of a plurality of events associated with a plurality of log messages;

for each log message of the plurality of log messages:

writing, by a real-time thread, characters of the log message into a buffer dedicated to the real-time thread using real-time safe commands;

receiving, by a non-real-time thread of the real-time robotics control framework, an indication that the log message has been written into the buffer; and reading the log message and writing to a non-real-time output channel.

Embodiment 2 is the method of embodiment 1, wherein writing, by the real-time thread to the buffer dedicated to the real-time thread, the characters of the log message using the real-time safe commands comprises:

executing the real-time safe commands during every tick of a real-time control cycle.

Embodiment 3 is the method of any one of embodiments 1 or 2, wherein the real-time safe commands are operating system functions that are non-blocking and deterministic.

Embodiment 4 is the method of embodiment 2, further comprising:

preallocating the buffer for the real-time thread prior to executing the real-time safe commands based on the characters of the log message.

Embodiment 5 is the method of any one of embodiments 1-4, wherein writing, by the real-time thread to the buffer dedicated to the real-time thread, the characters of the log message using the real-time safe commands comprises:

truncating one or more characters of the log message based on the characters of the log message being a maximum size.

Embodiment 6 is the method of embodiment 5, wherein truncating the one or more characters comprises truncating one or more decimal digits of a floating point number.

Embodiment 7 is the method of any one of embodiments 1-6, further comprising:

filtering one or more log messages of the plurality of log messages based on a counter.

Embodiment 8 is the method of embodiment 7, wherein filtering the one or more log messages is based on the counter indicating a threshold number of log messages within a particular time frame, the counter indicating that the one or more log messages is the n-th log message, or both.

Embodiment 9 is the method of any one of embodiments 1-8, wherein receiving, by the non-real-time thread of the real time robotics control framework, the indication that the log message has been written into the buffer comprises:

waking up the non-real-time thread using an atomic flag, a user space mutex, or both.

Embodiment 10 is the method of any one of embodiments 1-9, wherein reading the log message and writing to the non-real-time output channel comprises:

writing to a file.

Embodiment 11 is the method of any one of embodiments 1-9, wherein reading the log message and writing to the non-real-time output channel comprises:

writing to a cloud-based system.

Embodiment 12 is the method of embodiment 11, further comprising:

querying the cloud-based system for one or more particular types of log messages, wherein the particular types include real-time error messages.

Embodiment 13 is the method of any one of embodiments 1-12, wherein the real-time thread corresponds to one or more sensors, one or more robots, or a combination thereof.

Embodiment 14 is a system comprising one or more computers and one or more storage devices storing instructions that when executed by the one or more computers cause the one or more computers to perform operations comprising:

receiving, by a real-time robotics control framework, a plurality of indications of a plurality of events associated with a plurality of log messages;

for each log message of the plurality of log messages:

writing, by a real-time thread of the real-time robotics control framework, characters of the log message into a buffer dedicated to the real-time thread using real-time safe commands;

receiving, by a non-real-time thread of the real-time robotics control framework, an indication that the log message has been written into the buffer; and reading the log message and writing to a non-real-time output channel.

Embodiment 15 is the system of embodiment 14, wherein writing, by the real-time thread to the buffer dedicated to the real-time thread, the characters of the log message using the real-time safe commands comprises:

executing the real-time safe commands during every tick of a real-time control cycle.

Embodiment 16 is the system of any one of embodiments 14 or 15, wherein the real-time safe commands are operating system functions that are non-blocking and deterministic.

Embodiment 17 is the system of embodiment 15, wherein the operations further comprise:

preallocating the buffer for the real-time thread prior to executing the real-time safe commands based on the characters of the log message.

Embodiment 18 is the system of any one of embodiments 14-17, wherein writing, by the real-time thread to the buffer dedicated to the real-time thread, the characters of the log message using the real-time safe commands comprises:

truncating one or more characters of the log message based on the characters of the log message being a maximum size.

Embodiment 19 is the system of embodiment 18, wherein truncating the one or more characters comprises truncating one or more decimal digits of a floating point number.

Embodiment 20 is the system of any one of embodiments 1-19, wherein the operations further comprise:

filtering one or more log messages of the plurality of log messages based on a counter.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain some cases, multitasking and parallel processing may be advantageous.

What is claimed is:

1. A computer-implemented method comprising:

receiving, by a real-time robotics control framework, a plurality of indications of a plurality of events associated with a plurality of log messages;

for each log message of the plurality of log messages:

writing, by a real-time thread, characters of the log message into a buffer dedicated to the real-time thread using real-time safe commands;

receiving, by a non-real-time thread of the real-time robotics control framework, an indication that the log message has been written into the buffer; and reading the log message and writing to a non-real-time output channel.

2. The method of claim 1, wherein writing, by the real-time thread to the buffer dedicated to the real-time thread, the characters of the log message using the real-time safe commands comprises:

executing the real-time safe commands during every tick of a real-time control cycle.

3. The method of claim 1, wherein the real-time safe commands are operating system functions that are non-blocking and deterministic.

4. The method of claim 2, further comprising:

preallocating the buffer for the real-time thread prior to executing the real-time safe commands based on the characters of the log message.

5. The method of claim 1, wherein writing, by the real-time thread to the buffer dedicated to the real-time thread, the characters of the log message using the real-time safe commands comprises:

truncating one or more characters of the log message based on the characters of the log message being a maximum size.

6. The method of claim 5, wherein truncating the one or more characters comprises truncating one or more decimal digits of a floating point number.

7. The method of claim 1, further comprising:

filtering one or more log messages of the plurality of log messages based on a counter.

8. The method of claim 7, wherein filtering the one or more log messages is based on the counter indicating a threshold number of log messages within a particular time frame, the counter indicating that the one or more log messages is the n-th log message, or both.

9. The method of claim 1, wherein receiving, by the non-real-time thread of the real time robotics control framework, the indication that the log message has been written into the buffer comprises:

waking up the non-real-time thread using an atomic flag, a user space mutex, or both.

10. The method of claim 1, wherein reading the log message and writing to the non-real-time output channel comprises:

writing to a file.

11. The method of claim 1, wherein reading the log message and writing to the non-real-time output channel comprises:

writing to a cloud-based system.

12. The method of claim 11, further comprising:

querying the cloud-based system for one or more particular types of log messages, wherein the particular types include real-time error messages.

13. The method of claim 1, wherein the real-time thread corresponds to one or more sensors, one or more robots, or a combination thereof.

14. A system comprising one or more computers and one or more storage devices storing instructions that when executed by the one or more computers cause the one or more computers to perform operations comprising:

receiving, by a real-time robotics control framework, a plurality of indications of a plurality of events associated with a plurality of log messages;

for each log message of the plurality of log messages:

writing, by a real-time thread of the real-time robotics control framework, characters of the log message into a buffer dedicated to the real-time thread using real-time safe commands;

receiving, by a non-real-time thread of the real-time robotics control framework, an indication that the log message has been written into the buffer; and reading the log message and writing to a non-real-time output channel.

15. The system of claim 14, wherein writing, by the real-time thread to the buffer dedicated to the real-time thread, the characters of the log message using the real-time safe commands comprises:

executing the real-time safe commands during every tick of a real-time control cycle.

16. The system of claim 15, wherein the operations further comprise:

preallocating the buffer for the real-time thread prior to executing the real-time safe commands based on the characters of the log message.

17. The system of claim 14, wherein the real-time safe commands are operating system functions that are non-blocking and deterministic.

18. The system of claim 14, wherein writing, by the real-time thread to the buffer dedicated to the real-time thread, the characters of the log message using the real-time safe commands comprises:

truncating one or more characters of the log message based on the characters of the log message being a maximum size.

19. The system of claim 18, wherein truncating the one or more characters comprises truncating one or more decimal digits of a floating point number.

20. The system of claim 14, wherein the operations further comprise:

filtering one or more log messages of the plurality of log messages based on a counter.

* * * * *